Aug. 3, 1965   A. U. BRYANT   3,198,481
RECIPROCATING VALVE HAVING A THROTTLING ARRANGEMENT
AND PARTICULAR HEAD AND SEAT COOPERATION
Filed July 31, 1961   4 Sheets-Sheet 1

FIG-1-

INVENTOR.
AUSTIN U. BRYANT
BY
Attorney

INVENTOR.
AUSTIN U. BRYANT
BY
Edward B. Gregg
Attorney

FIG_5_

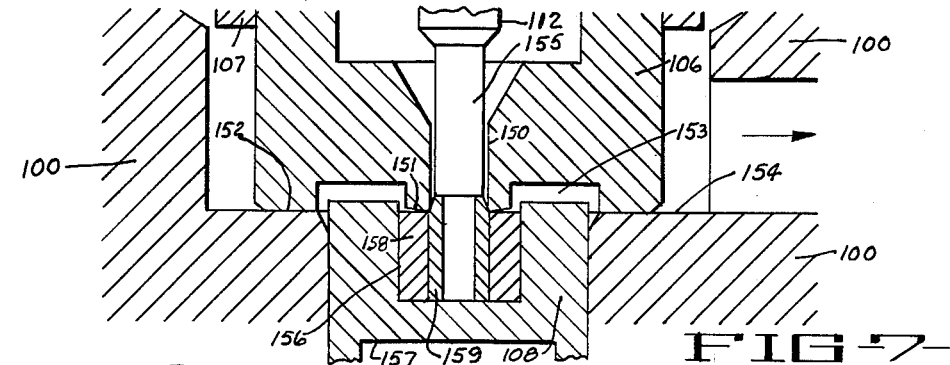
FIG-7-
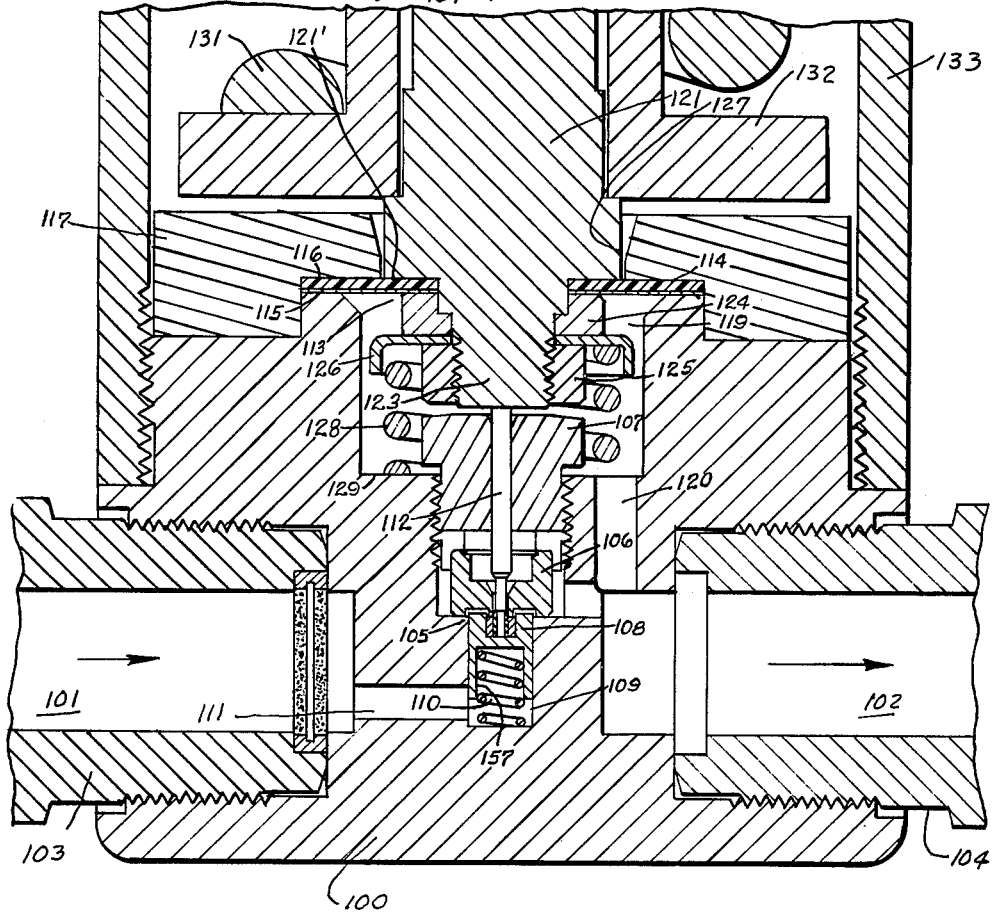
FIG.6.
INVENTOR.
AUSTIN U. BRYANT

United States Patent Office 3,198,481
Patented Aug. 3, 1965

3,198,481
RECIPROCATING VALVE HAVING A THROTTLING ARRANGEMENT AND PARTICULAR HEAD AND SEAT COOPERATION
Austin U. Bryant, Walnut Creek, Calif., assignor to Grove Valve and Regulator Company, Oakland, Calif., a corporation of California
Filed July 31, 1961, Ser. No. 128,102
6 Claims. (Cl. 251—210)

This invention relates generally to fluid flow control devices of the type having a valve member movable in opposite directions between an open and a closed position and having a valve working surface which seals against or cooperates with a stationary valve working surface formed in the body of the control device.

Many valves and flow regulating devices employ sealing members or valve inserts formed of a resilient material like synthetic rubber, neoprene, Teflon, Kel F, nylon or the like. In some instances metal-to-metal valve working surfaces are provided in conjunction with seal members or inserts formed of resilient material where the resilient seal member is in the form of an annulus which is clamped between cooperating parts forming a valve seat assembly. In such construction it has been found that the application of a relatively high fluid pressure differential may cause the resilient seal member to "cold flow" with the resulting deformation causing leakage across the cooperating working surfaces. Furthermore, "cold flow" deformation may cause partial or complete dislodgement of the seal member resulting in pinching effects and thereby impeding the free movement of the movable valve member.

Generally speaking, "cold flow" causes a deformation of the resilient insert because of a high pressure differential thereacross. Heretofore "cold flow" effects have been minimized by utilization of a so-called "hard" resilient plastic such as nylon or Kel F. However, at pressures in excess of say 6,000 p.s.i. even nylon and Kel F may exhibit "cold flow" effects so that the substitution of harder resilient plastics is not a solution in every case. Also, in certain applications such as for example, the control of high pressure gaseous or liquid oxygen, relatively hard nylon has been found to react with oxygen making it unsuitable as a material for a seal member. Teflon on the other hand has been found ideally suited for many applications because it is relatively inert to many fluids, but its softness has restricted its usefulness to low pressure applications.

It is therefore an object of this invention to provide a valve construction which eliminates the "cold flow" problem making it possible to utilize relatively soft resilient plastic seal members in the control of relatively high pressures.

A further problem which has been encountered in the utilization of resilient plastic seat inserts is deterioration due to erosion. Erosion is usually caused by high velocity fluid flow when fluid under high pressure is forced through a restricted orifice such as across a valve working surface just prior to closing or just after opening the valve. As the valve tends to assume its open position the velocity of fluid flow decreases since the gap widens and the pressure remains substantially constant.

It is therefore another object of this invention to provide a valve construction in which erosion of the resilient seal member is minimized thereby substantially lengthening its useful life.

It is another object of this invention to provide a valve construction which during its closed position minimizes cold flow and which during opening and closing minimizes erosion of the resilient seal member.

It is a still further object of this invention to provide a valve construction in which valve inserts may be selected for their suitability in connection with the fluid to be controlled rather than upon their hardness to resist cold flow and erosion.

It is a further object of this invention to provide a valve construction of improved reliability, longer service and increased economy.

Additional objects and a better understanding of this invention may be had by reference to the following specification and the drawings in which:

FIG. 6 is an enlarged detail, in section, of the regulator of FIG. 5, illustrating the construction of its valve operating parts.

FIG. 7 is a further enlarged detail, in section, further illustrating the construction of the valve operating parts of FIG. 6.

Figure 1:
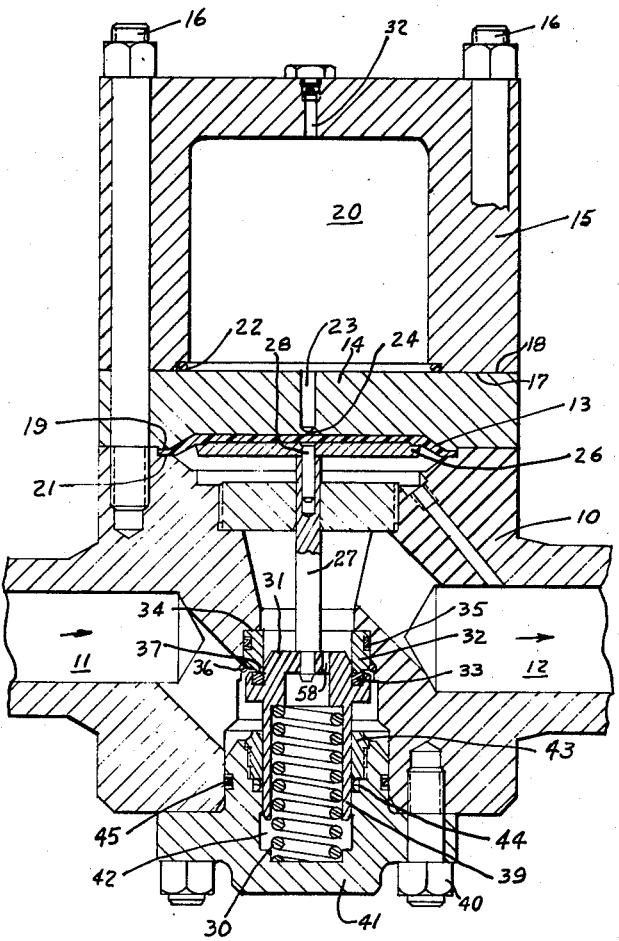
FIG. 1 is a side elevational view, in section, illustrating a pressure reducing regulator incorporating the invention.

Referring now to the drawings and more particularly to FIG. 1 thereof, there is shown a pressure reducing regulator comprising a valve body 10 including an inlet passage 11 and an outlet passage 12. Valve body 10 serves to mount a flexible diaphragm 13, a rigid dome plate 14 and a loading dome 15. The outer margins of dome plate 14 are tightly clamped between flanges 17 and 18 formed respectively on dome 15 and valve body 10. Clamping may be provided by means of clamping bolts 16. Flexible diaphragm 13 has a margin 19 which is clamped between an annular portion of dome plate 14 and annular face 21 formed on valve body 10. Sealing means 22 of the resilient O-ring type is shown between dome 15 and dome plate 14 providing a pressure tight chamber 20. Dome plate 14 is provided with a bore 23 terminating in a small control orifice 24 to provide stable operation as disclosed in U.S. Patent No. 2,177,825.

A diaphragm plate 26 underlies diaphragm 13 and engages a valve operating rod 27 connected thereto by a centering pin 28. Normally dome pressure chamber 20 is loaded with a gas under pressure which is introduced or vented out through a suitable needle valve and fitting such as is generally indicated by reference numeral 32.

The flow control means actuated by valve operating rod 27 comprises movable valve member 31 and stationary valve element 32 and resilient seal member 33 which in this instance is incorporated into movable valve member 31. Stationary valve element 32 comprises an annular seat ring formed of suitable metal which is removably seated within a recess 34 formed in valve body 10. It is sealed with respect to valve body 10 by suitable means such as a resilient seal ring 35 of the O-ring type and is held in place by suitable means such as a snap-in ring 36. Its lower surface is machined to provide a valve working surface 37 which may be a flat surface as shown in FIGURES 1 and 2 or a conical surface shown in FIGURES 3 and 4.

Valve member 31 includes a downward depending sleeve 39 which performs a balancing function and which fits into a bore 42 formed in a fitting 41 and bolted to valve body 10 by means of suitable screws such as bolts 40. A sleeve 43 may be placed into bore 42 to hold a sealing means 44 such as a seal ring of the O-ring type in place to provide a fluid tight seal between bore 42 and inlet passage 11. A similar seal ring 45 of the O-ring type provides a fluid tight seal between fitting 41 and valve body 10.

Figure 2:
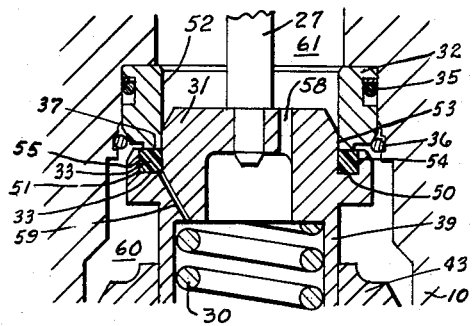
FIG. 2 is an enlarged detail, in section, of the regulator of FIG. 1 illustrating the construction of its valve operating parts.

Referring now to FIG. 2 there is shown an enlarged view of the flow control means comprising movable valve member 31 and stationary valve element 32. Movable valve member 31 is provided with an annular groove 50 which accommodates resilient seal member 33 having a surface 37 which is opposite to surface 51. Surfaces 37 and 51 comprise the corresponding valve working surfaces. The inner bore 52 of stationary valve element 32 is dimensioned to fit snugly and slidingly over a cylindrical extension 53 of movable valve element 31. In fact the inner peripheral wall 54 of accommodating recess 50 is a continuation of cylindrical extension 53 so that inner bore 52 is substantially of the same diameter as the inner diameter of resilient seal member 33. The outer peripheral surface 55 of seat insert 33 projects a short distance beyond the adjacent seating surface 37.

As shown in FIG. 1, the lower end of operating rod 27 is socketed within movable valve element 31. Also valve element 31 is provided with a vent 58 whereby the space within sleeve 39 is in fluid pressure communication with the downstream side of the regulator.

Operation of the device described is as follows: As is well known to those familiar with the operation of pressure reducer regulators, the regulator shown in FIG. 1 will maintain a substantially constant downstream pressure at the pressure level depending upon the loading or in other words, depending upon the pressure maintained within dome pressure chamber 20. During operation, and depending upon changes in the demand of the fluid on the downstream side (and neglecting changes in the applied pressure on the upstream side), movable valve elements 31 is moved by motion of diaphragm 13 to control the fluid flow. When valve element 31 moves to full closed position, the outer peripheral surface of cylindrical extension 53 of valve member 31 first slidingly engages the inner peripheral surface 52 of valve seat 32. Since these surfaces are dimensioned for close fit there will be substantial reduction of fluid flow between the upstream and the downstream sides. This occurs as soon as surfaces 52 and 53 slidingly engage one another and continues as valve element 31 moves upwards for compression of seal 33 between valve working surfaces 37 and 51. Consequently, fluid flow from the upstream to the downstream side is reduced immediately upon sliding engagement of surfaces 52 and 53 long before the valve working surfaces seat upon one another, the reduction being to the leakage flow between the peripheral surfaces 52 and 53.

Upon movement of the valve to the full open position, working surfaces 37 and 51 disengage permitting a small amount of fluid to leak between peripheral surfaces 52 and 53 until valve element 31 has moved down sufficiently to disengage peripheral surfaces 52 and 53. Consequently the flow remains leakage until complete disengagement.

The effect of opening and closing the valve upon seal member 33 will now be explained. In the closed position, high pressure of chamber 60 urges seal member 33 downward into recess 50 because the pressure is exerted upon the portion of surface 51 not engaged by valve working surface 37. Vent 59 provides fluid communication between recess 50 and the downstream side so that the pressure differential which exists across seal member 33 urges it into the recess. There is no pressure differential across the side faces of member 33. Additionally, insert 33 is pressed downward by the pressure of spring 30 due to contact with valve working surface 37.

Upon opening the flow control means, movable valve member 31 is urged downward by valve operating rod 27. Immediately upon separation of valve working surfaces 37 and 51 fluid under high pressure from chamber 60 is put into contact with the surface portion previously covered by valve working surface 37 thereby increasing the downward force upon seal member 33 without any transverse pressure differential being set up. Consequently, dimensioning opposing working surfaces in such a manner that in the closed position only a small inner peripheral portion of the working surface is exposed to the low pressure side prevents the establishment of substantial transverse pressure differential and thereby prevents distortion due to cold flow.

Reduction of fluid flow to a leakage current until the gap between the working surfaces is substantial shifts the high velocity fluid flow from the gap formed between the soft seal member and the opposed working surface to a gap formed between the cylindrical portions of slidingly engaged valve elements 31 and 32. In this manner high fluid flow is diverted from rushing over the relatively soft and erosion prone seal member 33. At the time full fluid flow starts, the soft insert forms a wide gap portion which provides for relatively low velocity fluid flow and consequently does not erode the soft seat insert.

Figure 3:
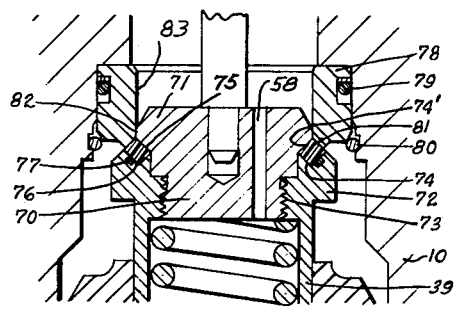
FIG. 3 is an enlarged detail, in section, illustrating another embodiment of the construction of the valve operating parts of FIG. 2.

In the embodiment shown in FIG. 3, movable valve element 70 is formed of two parts 71 and 72, which in this instance, are attached by threaded connection 73. Part 72 is formed integral with balancing sleeve 39. Resilient seal member 74 is a conoid conforming generally to a truncated cone and is clamped between parts 71 and 72. It will be noted that machining of parts 71 and 72 provides a pair of conical shaped opposing clamping faces 75 and 76 which clamp opposite sides of resilient seal member 74. The inner surface of seal member 74 may be fluid tightly sealed to surface 76 of part 72 by means of a seal ring 77 of the O-ring type, the remainder of the recess being vented to the downstream side through vent 58. Stationary valve member 78 is sealed with respect to body 10 by means of O-ring 79 and clamped in place by a spring retainer 80 and has a valve working surface 81 opposite to that of surface 74' of seal member 74 which seats upon surface 81 so that in the closed position, no portion thereof is exposed to the downstream side.

Part 71 is also provided with a short length cylindrical surface 82 dimensioned for sliding engagement with cylindrical bore 83 of stationary valve member 78. Venting of the recess holding insert 74 in place is provided by the space existing between parts 71, 72 and threaded connection 73.

In operation, the embodiment of the flow control means shown in FIG. 3 is similar to that explained in connection with the description of FIG. 2 in that cylindrical surfaces 82 and 83 remain in sliding engagement with one another and provide an imperfect fluid seal until the working surfaces 74' and 81 are well separated. Consequently, just prior to closing and before opening, fluid flow is reduced to leakage flow between surfaces 82 and 83 thereby preventing high speed fluid flow from eroding seal means 74. Also in the closed position, working surface 81 mates with the inner surface portion of working surface 74' leaving only a small annular portion of the working surface exposed to the downstream pressure fluid. The portion of the surface exposed is kept sufficiently small so that transverse forces causing cold flow remain negligible.

Figure 4:
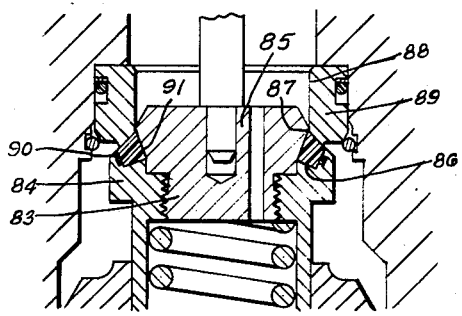
FIG. 4 is an enlarged detail, in section, illustrating a further embodiment of the construction of the valve operating parts of FIG. 2.

Referring now to FIG. 4, an embodiment similar to that of FIG. 3 is shown except that movable valve element 83, comprising parts 84 and 85, provides a recess for a seal member 86 of a somewhat different configuration and that part 85 is provided with an annular ridge 87 instead of a cylindrical surface. Annular ridge 87 is dimensioned for sliding engagement with the inner bore 88 of stationary valve member 89. Seal member 86 has a pair of parallel sides 90 and 91 which are clamped between parts 84 and 85. Its working surface is not at right angles with sides 90 or 91. In operation, the modification shown in FIG. 4 accomplishes the same objects as described above in that it provides a flow restriction upon disengagement of the working surfaces until annular edge 87 has gone downward sufficiently to clear cylindrical bore 88 and isolates the working surface of member 86 against being in fluid pressure communication with the downstream side in the closed position. Again, fluid flow is restricted to a leakage flow until the valve is in its open position, and member 86 is protected by proper dimensioning of opposed working surfaces from excessive transverse pressure differentials thereby preventing erosion and cold flow of seal member 86.

Figure 5:
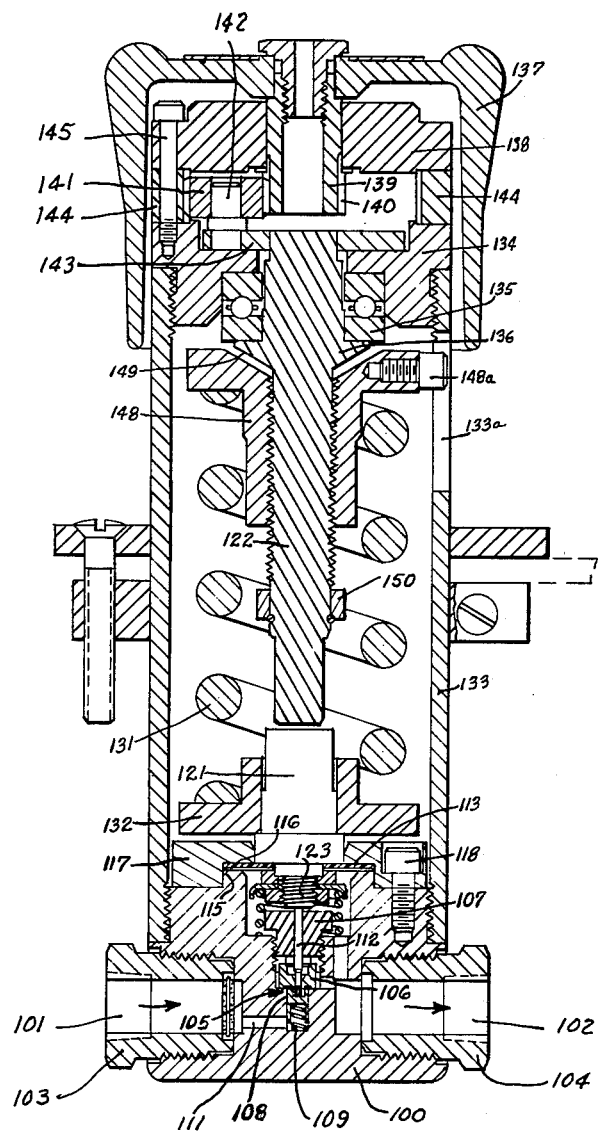
FIG. 5 is a side elevational view, in section, illustrating another pressure reducing regulator incorporating the present invention.

Referring now to FIGURES 5, 6 and 7, there is shown another type of pressure regulator embodiment of the instant invention in which the movable valve member incorporating the seal member is particularly suitable for pressure regulators of very small physical size.

The device comprises a regulator body 100 having an inlet passage 101 and an outlet passage 102. Inlet passage 101 is for connection with a source of high pressure fluid such as air or some other gas by means of a fitting 103. Similarly outlet passage 102 may be connected with a pressure system which is to be maintained at a desired pressure level lower than the high pressure side. The lower pressure system is connected to regulator body by means of a fitting 104. Regulator body 100 is provided with a space which houses the reducing valve assembly generally designated as 105. Valve assembly 105 comprises a stationary valve member 106, held in place by a threaded retainer 107. Movable valve member 108 is loosely disposed within a bore 109 and is urged towards its closed position with respect to stationary valve member 106 by a compression spring 110. Duct 111 connects inlet passage 101 with one end of bore 109.

Threaded retainer 107 loosely accommodates a valve operating rod 112 which operates movable valve element 108 by moving it downwards and separating it from valve element 106. A diaphragm assembly 113 operates valve assembly 105 and comprises a flexible diaphragm element 114 having its outer peripheral margin clamped between an annular shoulder 115 of regulator body 100 and an annular shoulder 116 formed on a clamping ring 117. Clamping ring 117 may be secured to regulator body 100 by suitable means such as screws 118. A space 119 defined on the lower side of diaphragm 114 is in communication with outlet passage 102 through a duct 120.

The inner peripheral margin of diaphragm 114 is clamped tightly against a shoulder 121' on a diaphragm back plate 121. Diaphragm back plate 121 also includes a centrally located stud 123 which passes through a centrally located opening in the diaphragm. Valve operating rod 112 is connected to the end of stud 123. Also clamped between retaining washer 124 and threaded nut 125 is a spring retainer 126. Diaphragm back plate 121 also includes a cylindrical portion which slidably interfits with a bore 127 of clamping ring 117. A spring 128 of the compression type is seated on shoulder 129 of regulator body 100 and presses against the lower side of spring retainer 126 thereby urging diaphragm back plate 121 in an upward direction.

It can therefore be seen that the bottom of diaphragm 114, which defines space 119, is urged upwards by spring 128 and the pressure maintained in outlet passage 102. The loading means acting upon the upper side of diaphragm 114 comprise a compression type spring 131, one end of which is seated upon a collar 132 carried by diaphragm back plate 121. Spring 131 and cooperating parts are enclosed with a shell or casing 133, one end of which is in threaded engagement with regulator body 100. The other end of shell 133 is provided with a threaded end portion which engages a plug 134 accommodating a thrust bearing 135. Bearing 135 engages a collar 136 integral with or affixed to a threaded member 122 whose lower end portion forms a stop to limit the upward movement of diaphragm back plate 121. Collar 134 is also provided with a central opening through which member 122 passes for engagement with some means for rotating member 122. One such means comprises a direct connection to an adjusting hand wheel 137.

Instead of connecting member 122 directly to hand wheel 137, a planetary type of gearing may be introduced there between to provide gear reduction between hand wheel 137 and member 122. An end mounting member 138 is bored to form a bearing for shaft 139, the lower end of which forms a pinion gear 140. Hand wheel 137 is affixed to the upper portion of shaft 139. Pinion 140 engages a planetary gear 141 which is rotatably carried by a pin 142. Pin 142 is also secured to a drive plate 143 integrally connected to member 122. Planetary gear 141 engages a ring gear 144 which is clamped between members 134 and 138 by means of clamping screws 145. In operation, rotation of hand wheel 137 rotates gear 141 which, because of its engagement with ring gear 144, slowly rotates pin 142 about the axis of member 122 carrying with it plate 143 securely fastened to member 122.

A flanged and internally threaded sleeve 148 forms a seat for the other end of compression spring 131 and is in threaded engagement with member 122. Thus, when member 122 is rotated by hand wheel 137, threaded sleeve 148 is moved longitudinally along member 122 depending upon the direction of rotation and thereby adjusts the force of spring 131 upon diaphragm back plate 121. A cap screw 148a moving in a slot 133a prevents rotation of sleeve 148.

It has been found desirable to limit movement of sleeve 148 in the up and down direction and therefore a shoulder 149 is provided which engages the sleeve when the sleeve is moved to decrease the force of spring 131. When moved downward or in the opposite direction, a collar engages the lower portion of sleeve 148. Sleeve 150 may be held in place by a snap ring. The flow control means, shown by the enlarged view of FIG. 7, comprises the stationary valve member 106 and movable valve member 108. Stationary valve member 106 is provided with a centrally spaced bore 150 and has two annular surfaces 151 and 152, separated by an annular undercut 153. Annular face 152 is substantially horizontal and seats upon surface 154 of regulator body 100. Annular surface 151 is machined to slope slightly upwards and outwards from bore 150 and comprises the working surface of stationary valve member 106. Valve operating rod 112 has a reduced end portion 155 which forms a push rod 155 passing through bore 150 in loosely sliding contact.

Movable valve element 108 is formed of a cylindrical plug having a bore 156 in its upper portion and a bore 157 in its lower portion. Bore 157 accommodates spring 110 which urges valve element 108 upward. Upper bore 156 contains an annular seal member 158 constructed of a resilient material such as the materials mentioned hereinabove, having a substantially rectangular cross section. A bushing 159 is driven into the inner space of seal member 158 so that member 158 is clamped between member 108 and bushing 159. Bushing 159 telescopes slightly above seal member 158 and is provided with a chamfer. The outside diameter of bushing 159 just below the chamfered portion is dimensioned to engage bore 150 so that when surface 151 is in contact with seal member 158, no part of member 158 is exposed to downstream pressure.

In operation, when the outlet pressure drops below a predetermined value, diaphragm 114 becomes unbalanced causing valve actuating rod 112 to move downward. The downward movement of valve actuating rod 112 causes push rod 155 to engage the upper surface of bushing 159 and thereby move valve element 108 downwards. Fluid from inlet passage 101 through duct 111 now passes between the sides of bore 109 and movable valve element 108 and between the annular working surfaces into space 119 and into outlet passage 102 until the diaphragm is once more balanced causing push rod 155 to retract and valve element 108 to seat upon annular surface 151 thereby shutting off further fluid flow.

In operation, the chamfer on bushing 159 restricts the flow of fluid as long as the telescoped portion of bushing 159 is within bore 150, thereby minimizing erosion of the seal means. Also, in the closed position the inner rim of working surface 151 lies very close to the inner edge of seal member 158 thereby minimizing the transverse forces which are responsible for cold flow. In the embodiment shown, the diameter of bore 150 is slightly larger than the outside diameter of bushing 159 so that a sliding fit is provided and the bushing may slide inside the bore. Therefore, a small inner portion of the working surface defined by seal member 158 is exposed to downstream pressure and therefore to transverse forces causing cold flow. The smaller the inner exposed portion, the less is the tendency to cold flow.

In an alternate embodiment, bushing 159 may be slightly undercut to permit engagement with a smaller diameter bore. Consequently, if the undercut is sufficiently long to extend below the working surface of seal member 158, the whole inner portion of the working surface may be engaged by working surface 151 to isolate the seal member working surface from the downstream pressure in the closed position. This further reduces the tendency for the seal member to be deformed by cold flow.

There has been described a new and novel valve construction of the type utilizing a stationary and a movable valve element cooperating with one another to provide the fluid flow control means. Also included is an annular seal member which has been described as being held by the movable valve member. It is to be understood that it may also be incorporated in the stationary valve member. The construction of this invention makes it possible to use much softer material for the resilient seal member than has been possible heretofore since "cold flow" and erosion are materially reduced.

What is claimed is:

1. A fluid flow control device comprising:
    a valve body having inlet and outlet flow passages,
    a stationary valve member intermediate said passages forming a cylindrical opening therebetween,
    a movable valve member on the upstream side of said stationary valve member and movable along the axis thereof,
    a reduced diameter, coaxial cylindrical extension on the downstream side of said movable valve member,
    said cylindrical extension being of a diameter to engage closely within said cylindrical opening to form a flow constricting throat permitting leakage thereby,
    said cylindrical extension being engaged in said cylindrical opening during just a portion of the movement of said movable valve member adjacent to said stationary valve member,
    One of said valve members having an annular working surface extending radially beyond the diameter of said cylindrical opening,
    the other of said valve members having an annular recess opposite said annular working surface, and
    a resilient seal ring disposed in said recess,
    the inner diameters of said working surface and said seal ring being substantially equal,
    the outer diameter of said seal ring being greater than the outer diameter of said working surface.

2. The fluid flow control device defined by claim 1 including:
    fluid passage means venting the bottom of said recess to the downstream side of said movable valve member.

3. The fluid flow control device defined by claim 1 wherein:
    said working surface and the opposing outer surface of said seal ring are formed as complementary conical surfaces.

4. The fluid flow control device defined by claim 2 wherein:
    said other valve member comprises two annular parts formed to provide parallel and opposed clamping faces of said recess,
    said two annular parts being joined by a threaded connection that permits fluid flow therethrough to the bottom of said recess, and
    means venting said threaded connection to the downstream side of said movable valve member.

5. The fluid flow control device defined by claim 1 wherein:
    said working surface is formed by an annular surface on the upstream side of said stationary valve member,
    said recess is on said movable valve member, and
    the inner diameter of said recess is substantially equal to the diameter of said cylindrical extension.

6. A fluid flow control device comprising:
    a valve body having inlet and outlet flow passages,
    a stationary valve member intermediate said passages forming a cylindrical opening therebetween,
    a hollow, movable valve member on the upstream side of said stationary valve member movable along the axis thereof,
    a reduced diameter, coaxial cylindrical extension on the downstream side of said movable valve member,
    said reduced extension being of a diameter to engage slidably within said cylindrical opening to form a flow constricting throat permitting leakage therethrough,
    said reduced cylindrical portion being engaged in said cylindrical opening during just a portion of the movement of said movable member adjacent to said stationary valve member,
    said stationary valve member having an annular working surface extending radially beyond the diameter of said cylindrical opening,
    said movable valve member having an annular recess opposite said annular working surface,
    a resilient seal ring snugly disposed in said recess, the inner diameters of said working surface and said recess being substantially equal,
    the outer diameter of said recess being greater than the outer diameter of said working surface,
    duct means from the hollow interior of said movable valve member opening at the downstream end thereof, and
    venting means from the interior of said movable valve member to the botttom of said recess.

References Cited by the Examiner

UNITED STATES PATENTS

| 2,519,541 | 8/50 | Bryant | 251—332 |
| 2,574,054 | 11/51 | Miller | 251—210 |
| 2,713,989 | 7/55 | Bryant | 251—324 |
| 2,898,082 | 8/59 | Von Almen et al. | 251—333 |
| 2,941,543 | 6/60 | Kleczek | 137—505.18 |

FOREIGN PATENTS

| 606,415 | 6/26 | France. |
| 769,247 | 6/34 | France. |
| 705,675 | 3/54 | Great Britain. |
| 846,106 | 8/60 | Great Britain. |
| 854,004 | 11/60 | Great Britain. |

ISADOR WEIL, *Primary Examiner.*

M. CARY NELSON, *Examiner.*